(12) United States Patent
Ockwell

(10) Patent No.: US 6,702,306 B1
(45) Date of Patent: Mar. 9, 2004

(54) PUSHCHAIRS

(76) Inventor: Andrew Ockwell, 18 Sion Road, Bath (GB), BA1 5SG ( * ) Notice: Subject to any disclaimer, the term of this patent is extended or adjusted under 35 U.S.C. 154(b) by 0 days.

(21) Appl. No.: 10/009,749

(22) PCT Filed: Jun. 8, 2000

(86) PCT No.: PCT/GB99/01806
§ 371 (c)(1),
(2), (4) Date: Dec. 7, 2001

(87) PCT Pub. No.: WO00/74997
PCT Pub. Date: Dec. 14, 2000

(51) Int. Cl.[7] .............................. B62B 9/08; B62B 9/12; B62B 7/04
(52) U.S. Cl. ............................... 280/47.41; 280/47.12; 280/47.38; 188/20
(58) Field of Search .......................... 280/304.1, 47.2, 280/47.41, 47.12, 43, 43.17, 47.38, 642, 643, 647, 650; 188/5, 9, 10, 19, 20

(56) References Cited

U.S. PATENT DOCUMENTS

| | | | | |
|---|---|---|---|---|
| 2,078,900 A | * | 4/1937 | Biles | 280/43.17 |
| 2,563,919 A | * | 8/1951 | Christensen | 280/47.17 |
| 4,310,167 A | * | 1/1982 | McLaurin | 280/47.41 |
| 5,158,319 A | * | 10/1992 | Norcia et al. | 280/47.38 |
| 5,294,141 A | * | 3/1994 | Mentessi et al. | 280/250 |
| 5,348,326 A | * | 9/1994 | Fullenkamp et al. | 280/43.17 |
| 5,848,658 A | * | 12/1998 | Pulver | 280/304.1 |
| 6,070,898 A | * | 6/2000 | Dickie et al. | 280/304.1 |
| 6,199,647 B1 | * | 3/2001 | Schaffner et al. | 180/65.1 |
| 6,264,218 B1 | * | 7/2001 | Slagerman | 280/43 |
| 6,347,688 B1 | * | 2/2002 | Hall et al. | 188/5 |
| 6,454,285 B1 | * | 9/2002 | Koenig | 280/250.1 |
| 6,454,286 B1 | * | 9/2002 | Hosino | 280/304.1 |
| 6,460,641 B1 | * | 10/2002 | Kral | 280/250.1 |

* cited by examiner

*Primary Examiner*—Brian L. Johnson
*Assistant Examiner*—Jeffrey J. Restifo
(74) *Attorney, Agent, or Firm*—Galgano & Burke

(57) ABSTRACT

A pushchair of the type which includes a chassis which is born upon one or more primary wheels on a primary wheel bearing axis, the chassis further having one or more forward and/or rear secondary wheel(s) or stabilizer(s) that in normal use of the pushchair during horizontal travel is/are not ground engaging but which limit tilting of the pushchair about the primary axis, the pushchair being characterized in that it further includes a selectively operable stabilizer which may be deployed to bring a prop into ground engagement to substantially prevent tilting of the pushchair about the primary wheel axis when the pushchair is stationary.

17 Claims, 2 Drawing Sheets

PUSHCHAIRS

FIELD OF THE INVENTION

The present invention concerns improvements to pushchairs of the type having a chassis which is born upon one or more primary wheels on a primary wheel bearing axis.

BACKGROUND TO THE INVENTION

The present Applicant's earlier UK Patent GB 2265341 describes a type of pushchair which has its chassis born upon one or more primary wheels on a primary wheel bearing axis and having forward and/or rear secondary wheels or stabilizers that in normal use of the pushchair are not ground engaging. The chassis and as seat for the child are arranged to place the center of gravity of the occupied pushchair at or near to the primary transverse axis, comprising an axle or coaxial series of axles. To which the main wheel or wheels are mounted. The secondary wheels or stabilizers are configured to have ground clearance of several centimeters when the pushchair is balanced over the primary axis. When the pushchair is at rest either the front or the rear secondary wheel(s) or stabilizers is/are in ground contact but the other is clear of the ground. The function of the secondary wheels or stabilizers is to assist in curb climbing and to provide additional stability, limiting excessive tilting about the primary axis.

The center of gravity of the pushchair is located in this distinctive way partly in order that the user benefits from the greater mechanical efficiency of balancing on centralized large main wheel(s) compared with the spread out relatively small wheels of conventional pushchairs. The configuration also brings substantial advantages when turning. The balancing of the weight of the pushchair over the main wheel(s) greatly facilitates maneuvering.

Although the design brings significant advantages in use and although the pushchair does have the secondary wheel (s) or stabilizers to limit tilting about the primary axis, there is a potential problem of a child moving about in the seat when the pushchair is stationary causing it to rock back and forth about the primary axis. This could be unsettling to the child and in an extreme case might lead to backward and forward oscillation that compromises the overall stability of the stationary pushchair.

SUMMARY OF THE INVENTION

According to the present invention there is provided a pushchair of the type which comprises a chassis which is born upon one or more primary wheels on a primary wheel bearing axis, the chassis further having one or more forward and/or rear secondary wheel(s) or stabilizer(s) that in normal use of the pushchair during horizontal travel is/are not ground engaging but which limit tilting of the pushchair about the primary axis, the pushchair being characterized in that it further comprises a selectively operable stabilizer means which may be deployed to bring a prop means into ground engagement to substantially prevent tilting of the pushchair about the primary wheel axis when the pushchair is stationary.

In one preferred embodiment, the forward or rear secondary wheel(s) or stabilizers is/are selectively operable to be deployed to move into ground engagement when the pushchair is stationary.

The stabilizer means may comprise an adjustment mechanism whereby the chassis may be lowered relative to the primary wheel axis to bring the forward or rear secondary wheel(s) or stabilizer(s) into ground engagement.

In such arrangement lowering of the chassis may also bring a brake block into contact with the primary wheel(s). This is particularly advantageous since it enables operation of the stabilizing mechanism to be effected simultaneously with braking, greatly simplifying the actions involved in parking of the pushchair.

In an alternative embodiment of the present invention, the selectively operable stabilizer means may comprise an independent prop means that is mounted to the chassis and moveable from a stowed position adjacent the chassis to an extended position in which it props the chassis against tilting about the primary axis. Such a prop may also be adapted to engage the pushchair primary wheel(s) to simultaneously function as a brake.

Preferably in each of he above embodiments he selective operation of the selectively operable stabilizer means is effected by operation of a hand or foot operable lever which is mounted to the chassis of the pushchair. Such lever is preferably pivotally mounted to the chassis of the pushchair.

BRIEF DESCRIPTION OF THE DRAWINGS

Two preferred embodiments of the present invention will now be more particularly described, by way of example, with reference to the accompanying drawings, wherein.

DESCRIPTION OF THE PREFERRED EMBODIMENTS

Figure 1:
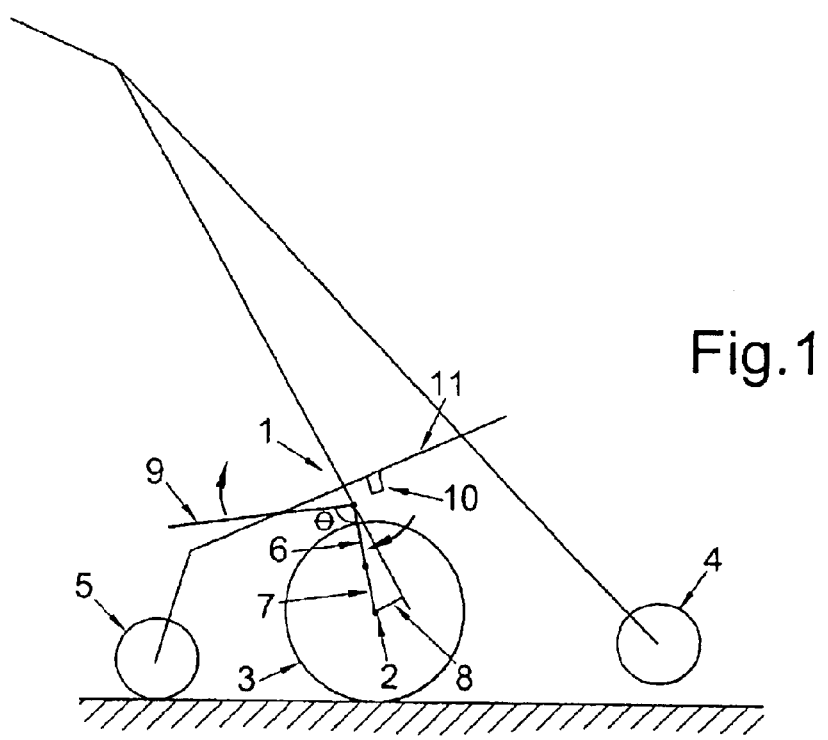
FIG. 1 is a schematic side elevation view of a pushchair of the first preferred embodiment while stationary and resting on rear stabilizer wheels.
Figure 2:
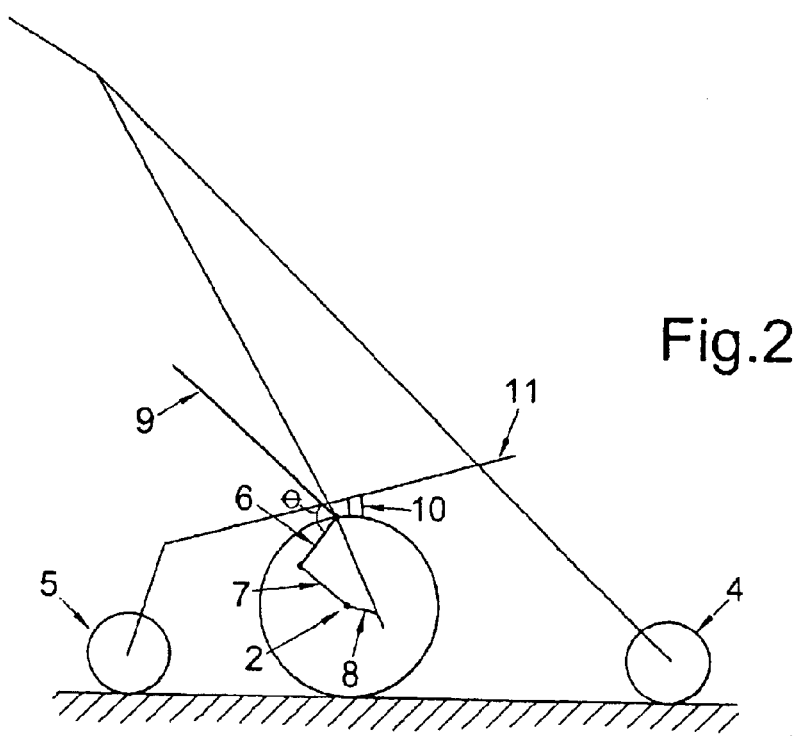
FIG. 2 is a side elevation view of the pushchair of the first preferred embodiment but with the selectively operable stabilizer means actuated to bring the chassis of the pushchair down over the primary wheel bearing axis and bring the front stabilizer wheels into ground contact.

Referring firstly to FIGS. 1 and 2, in this first preferred embodiment the chassis (1) of the pushchair is adapted to be lowered over the primary wheel axle (2) to fully stabilize the pushchair when stationary. In common with the designs of pushchair illustrated in earlier UK Patent GB 2265341 and PCT/GB93/00595, the wheelchair has one or a pair of main load bearing wheels mounted on a single primary axle or a pair of coaxial axles along a single primary axis (2). The main load bearing wheel(s) (3) is/are substantially larger than the conventional pushchair wheel and may have a diameter of greater than 15 cm, including the thickness of the tire (where present) for example.

The chassis (1) may be of relatively conventional form comprising a framework bearing a seat and with the sides of the framework reaching upwardly to terminate in a handlebar that extends transversely over the pushchair to be gripped by both hands as the pushchair is pushed forward.

In the illustrated embodiment the pushchair has not only the main load bearing wheels (3) on the primary axis but also one or a pair of front stabilizer wheels (4) at the front of the pushchair extending forwardly of the main load bearing wheels (3) and also one or a pair of rear stabilizing wheels (5) extending rearwardly of the main load bearing wheels (3).

Either the front or the rear stabilizing wheels (4, 5) may be in ground engagement at the same time as the main load bearing wheels during normal operation of the pushchair. The greatest mechanical advantage of the main load bearing wheels (3) is achieved when they alone are in ground contact and both front and rear stabilizer wheels (4,5) are clear of the ground. However, for comfort of the user, for example, and during rest when the pushchair is stationary and not supported by the user, the front or the rear stabilizing wheels (4, 5) will support the pushchair, as illustrated in FIG. 1.

In this rest position there is only limited opportunity for movement of the pushchair tilting about the primary axis (2). However, even this limited movement may be undesirable. Accordingly, the pushchair incorporates a selectively operable stabilizing means that comprises a series of pivoted linkages (6, 7, 8) and a hand operating lever (9). When the lever (9) is raised, as illustrated in FIG. 2, this causes the first linkage element (6) to pivot rearwardly and upwardly, drawing the second linkage element (7) rearwardly and lowering the chassis (1) over the primary axis/axle (2). As will be appreciated, the first linkage element (6) is pivotally attached to the chassis (1) at its end engaged with the lever arm (9). The third linkage element (8) is pivoted about the primary axle (2) and also engages the lower end of the chassis (1).

Lowering of the chassis (1) over the primary axle (2) has the effect of bringing the front stabilizer wheels (4) into ground engagement. This effectively prevents the pushchair from thereafter tilting about the primary axle (2) and provides the required stability of the pushchair when stationary.

A further effect achieved by lowering of the pushchair chassis (1) is that it lowers the center of gravity and makes the pushchair inherently more stable against destabilizing forces in any direction. An even further effect is that a brake block (10) mounted to the underside of the chassis (1) to seat supporting portion (11) is brought into contact with the main load bearing wheel (3) to brake the pushchair against forward or rearward rolling motion. This, therefore, provides stabilizing and securing functions with one simple actuating lever operation.

Figure 3:
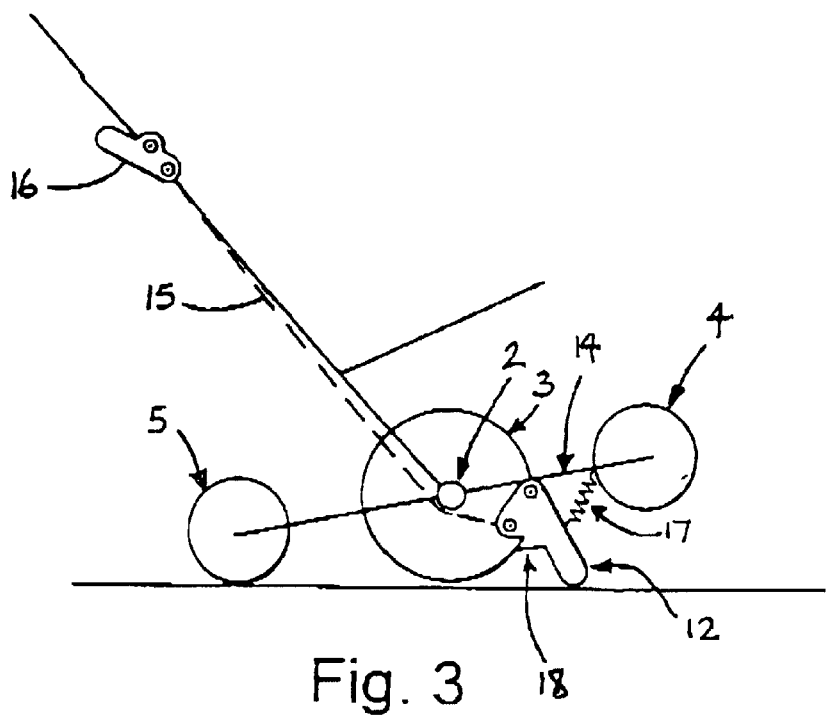
FIG. 3 is a schematic side elevation view of a second preferred embodiment of the pushchair stationary and with selectively operable stabilizer means comprising an independent prop, shown in ground engagement.
Figure 4:
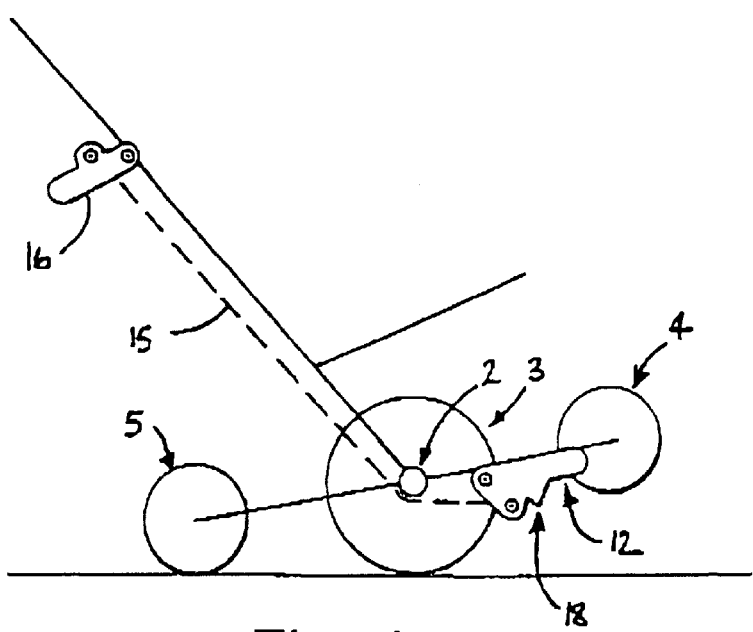
FIG. 4 is a side elevation view of the pushchair of the second preferred embodiment and with the prop raised from ground engagement.

Turning to the second illustrated embodiment, at FIGS. 3 and 4, this incorporates a simpler construction of selectively operable stabilizing means. Here, the chassis (1) is not adapted to be lowered but instead there is an independent prop means (12) pivoted to a lower member (14) of the chassis (1). This prop mean (12) is linked by a wire cable (15) to an operating hand lever (16) on the handle stem/handlebar of the chassis (1). A resilient biasing means/compression spring (17) is provided to bias the prop (12) to a stowed position, as illustrated in FIG. 4 but is over-ridden by the cable (15) that is pulled by the operating hand lever (16).

A secondary function of the selectively operable stabilizing means of this embodiment is again a braking function. A rear portion (17) of the prop (12) or a member projecting from it serves to engage the main load bearing wheel (3) to brake the wheel when the prop (12) is brought into ground engagement.

Although not illustrated, a further embodiment of the present invention mentioned earlier is the provision of a selectively adjustable mechanism for bringing the front stabilizer wheels (4) (or stabilizer(s)) or the rear stabilizer wheels (5) (or stabilizer(s)), whichever is clear of the ground when the pushchair is at rest, selectively into ground engagement to prevent the pushchair from tilting about the primary axis (2). Such mechanism preferably incorporates one or more levers, cables or other linkages similarly to the first and second embodiments to enable operation by the user remotely, Movement of stabilizer wheels (4) or (5) into ground engagement is preferably by pivoting of the stabilizer leg(s) on which the wheels (4) or (5) are mounted.

What is claimed is:

1. A pushchair of the type which comprises a chassis which is born upon one or more primary wheels on a primary wheel bearing axis, the chassis further having one or more forward and/or secondary wheel(s) or forward and/or rear stabilizers that in normal use of the pushchair during horizontal travel is/are not ground engaging but which limit tilting of the pushchair about the primary axis, the pushchair being characterized in that it further comprises a selectively operable stabilizer means which may be deployed to bring a prop means into ground engagement to substantially prevent tilting of the pushchair about the primary wheel axis when the pushchair is stationary, wherein the stabilizer means comprises an adjustment mechanism whereby the chassis may be lowered relative to the primary wheel axis to bring the forward or rear secondary wheel(s) or stabilizer(s) into ground engagement and lowering of the chassis brings a brake block into contact with the primary wheel(s).

2. A pushchair as claimed in claim 1, wherein the forward or rear secondary wheel(s) or forward or rear stabilizer is/are selectively operable to be deployed to move into ground engagement when the pushchair is stationary.

3. A pushchair as claimed in claim 1, wherein the selective operation of the selectively operable stabilizer means is effected by operation of a hand or foot operable lever which is mounted to the chassis of the pushchair.

4. A pushchair as claimed in claim 3, wherein the lever is pivotally mounted to the chassis of the pushchair.

5. A pushchair as claimed in claim 3, wherein the lever is pivotally mounted to the chassis of the pushchair.

6. A pushchair of the type which comprises a chassis which is born upon one or more primary wheels on a primary wheel bearing axis, the chassis further having one or more forward and/or rear secondary wheel(s) or forward and/or rear stabilizer(s) that in normal use of the pushchair during horizontal travel is/are not ground engaging but which limit tilting of the pushchair about the primary axis, the pushchair being characterized in that it further comprises a selectively operable stabilizer means which may be deployed to bring a prop means into ground engagement to substantially prevent tilting of the pushchair about the primary wheel axis when the pushchair is stationary, wherein the selectively operable stabilizer means comprises a prop means that is mounted to the chassis and moveable from a stowed position adjacent the chassis to an extended position in which it props the chassis against tilting about the primary axis, and where the prop is also adapted to engage the pushchair primary wheel(s) to function as a brake.

7. A pushchair as claimed in claim 6, wherein the selective operation of the selectively operable stabilizer means is effected by operation of a hand or foot operable lever which is mounted to the chassis of the pushchair.

8. A pushchair of the type which comprises a chassis supported by at least one primary wheel mounted on a primary wheel bearing axle, the chassis further having at least one stabilizer that in normal use of the pushchair during horizontal travel is not ground engaging but which limits tilting of the pushchair about the primary wheel bearing axle, and a brake block, said pushchair further comprising selectively operable stabilizer means including prop means which may be deployed to bring said prop means into ground engagement to substantially prevent tilting of the pushchair about the primary wheel bearing axle when the pushchair is stationary, wherein said stabilizer means comprises an adjustment mechanism for lowering the chassis relative to the primary wheel bearing axle to bring said stabilizer into ground engagement and wherein lowering of said chassis brings said brake block into contact with said primary wheel.

9. A pushchair as claimed in claim 8, wherein said chassis has at least two of said at least one stabilizer, comprising a forward stabilizer and a rearward stabilizer.

10. A pushchair as claimed in claim 9, wherein said forward and rearward stabilizers each comprising a secondary wheel.

11. A pushchair as claimed in claim 9, wherein said forward and rearward stabilizers each comprise a pair of secondary wheels.

12. A pushchair as claimed in claim 8, wherein the selective operation of the selectively operable stabilizer means is effected by operation of a hand or foot operable lever which is mounted to the chassis of the pushchair.

13. A pushchair of the type which comprises a chassis supported by at least one primary wheel mounted on a primary wheel bearing axle, the chassis further having at least one stabilizer that in normal use of the pushchair during horizontal travel is not ground engaging but which limits tilting of the pushchair about the primary wheel bearing axle, said pushchair further comprising selectively operable stabilizer means including prop means which may be deployed to bring said prop means into ground engagement to substantially prevent tilting of the pushchair about the primary wheel bearing axle when the pushchair is stationary, said prop means being mounted to said chassis and moveable from a stowed position adjacent the chassis to an extended position in which it props the chassis against tilting about the primary wheel bearing axle, and where the prop is also adapted to engage the pushchair primary wheel to function as a brake.

14. A pushchair as claimed in claim 13, wherein said chassis has at least two of said at least one stabilizer, comprising a forward stabilizer and a rearward stabilizer.

15. A pushchair as claimed in claim 14, wherein said forward and rearward stabilizers each comprising a secondary wheel.

16. A pushchair as claimed in claim 14, wherein said forward and rearward stabilizers each comprise a pair of secondary wheels.

17. A pushchair as claimed in claim 13, wherein the selective operation of the selectively operable stabilizer means is effected by operation of a hand or foot operable lever which is mounted to the chassis of the pushchair.

\* \* \* \* \*